Nov. 14, 1961 — C. S. MURCH — 3,008,569
DISPOSE ALL LITTER BAG
Filed Jan. 13, 1959
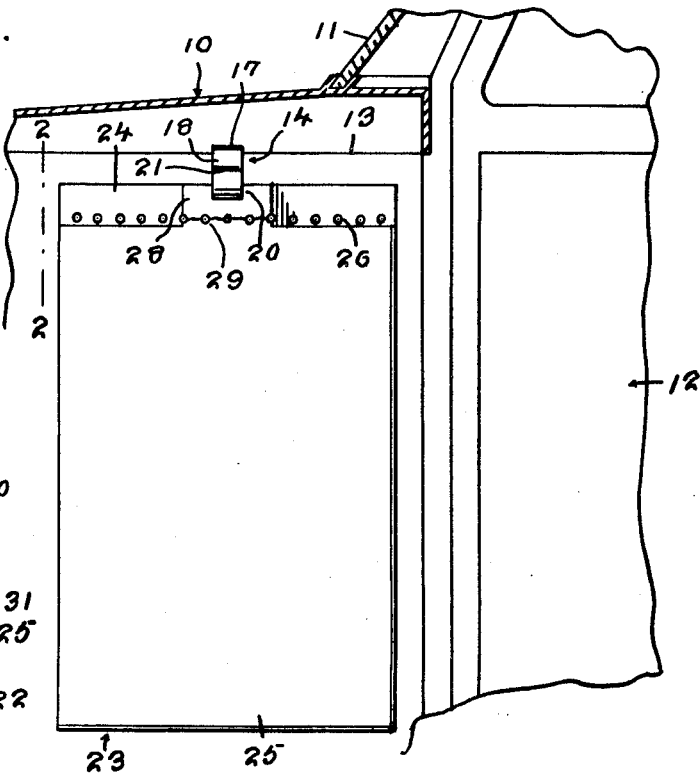
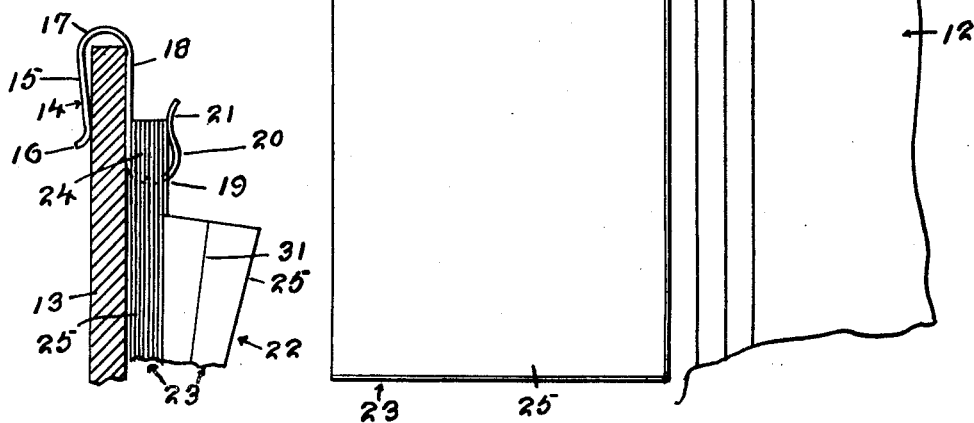
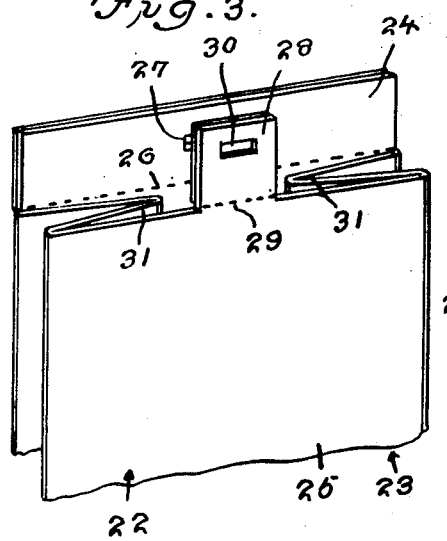
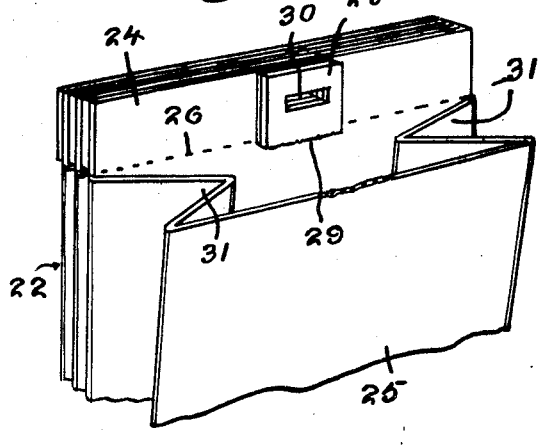
INVENTOR.
Charles S. Murch
BY
ATTORNEYS

United States Patent Office 3,008,569
Patented Nov. 14, 1961

3,008,569
DISPOSE ALL LITTER BAG
Charles S. Murch, 39½ Melville St., Augusta, Maine
Filed Jan. 13, 1959, Ser. No. 786,637
1 Claim. (Cl. 206—19.5)

This invention relates to a litter bag, and more particularly to a litter bag for mounting in and use with a vehicle such as an automobile.

The object of the invention is to provide a litter bag assembly wherein a plurality of bags are conveniently supported in the interior of a vehicle such as an automobile so that trash, refuse, or other material can be conveniently placed in the bag whereby it will be unnecessary to discard or throw the trash out of the window of the vehicle and litter up the streets, highways or other areas over which the vehicle is traveling.

Another object of the invention is to provide a litter bag assembly wherein a plurality of bags are conveniently supported within the interior of the vehicle so that after one bag becomes full or used up, such a bag can be readily removed whereby the next bag is in convenient location ready to be used.

A further object of the invention is to provide a litter bag assembly which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a fragmentary sectional view illustrating the litter bag assembly of the present invention being used;

FIGURE 2 is a sectional view taken on the line 2—2 of FIGURE 1;

FIGURE 3 is a perspective view with parts broken away;

FIGURE 4 is a perspective view showing a plurality of the bags in superposed relation with respect to each other, and showing a portion of one of the bags separated from its holding tab.

Referring in detail to the drawings, the numeral 10 indicates a portion of a conventional vehicle such as an automobile which includes the usual front windshield 11, front door 12, and interior lining 13.

According to the present invention there is provided a litter bag assembly which is indicated generally by the numeral 22, and it will be seen that the assembly of the present invention includes a support member which is indicated by the numeral 14. The support member 14 includes a generally vertical first section 15 which has a lower outwardly curved end 16, and there is also provided a curved second section 17 which extends over the top of the lining 13, FIGURE 2. The second section 17 terminates in a downwardly positioned generally vertical third section 18 which has a fourth curved section 19 adjacent its lower end, and the fourth section 19 terminates in a generally vertical fifth section 20 which has an upper outwardly curved end portion 21.

There is further provided a plurality of similar litter bags which are indicated by the numeral 23, and there is provided on the upper end of each bag 23 a rectangular strip 24. Each bag 23 includes a main body portion 25 which is joined to its respective upper strip 24 by means of a tear line or perforated line 26, and the strips 24 are provided with registering openings or slots 27 for the projection therethrough of a portion of the support member 14. There is further provided tabs 28 which are joined to portions of the bags 23 by means of tear lines 29, and when the bag is to be used, it can be torn along the line 29 so that the parts can move from the position shown in FIGURE 3 to the position shown in FIGURE 4 so that the bag will be opened whereby litter, refuse or the like can be conveniently dropped therein. The tabs 28 are provided with slots which are indicated by the numeral 30, and the slots 30 register with the slots 27 for the projection therethrough of a portion of the support member 14. Each bag 23 further includes opposed side portions 31 which have accordion-like folds so as to permit the bags to properly open when they are to be used.

From the foregoing, it is apparent that there has been provided a litter bag assembly which is especially suitable for use in a vehicle such as an automobile. With the present invention, litter, refuse or the like can be conveniently supported in the bags 23 so that it will not be necessary to discard or throw the litter out of the vehicle and mess up streets, roads or the like. After a bag 23 is used up or full of litter or refuse, it can be readily torn off along the perforated line 26 and then placed in a suitable receptacle, trash can or the like, and then the next bag is ready to be used.

The bags 23 are adapted to have their strips 24 secured together as for example by means of a suitable adhesive or glue, and the tabs 28 may be secured to the strips 24 by a similar glue or adhesive. The fold portions 31 permit the bags 23 to be readily opened from the position shown in FIGURE 3 for example to the position shown in FIGURES 2 or 4 so that the litter can be conveniently placed therein. The tabs 28 and strips 24 are provided with registering slots 30 and 27 so that a portion of the support member 14 can be conveniently extended therethrough. The support member 14 is adapted to be arranged in engagement with the upper edge of a portion 13 of the vehicle lining or interior whereby the bags can be conveniently supported. When a bag is to be used, initially it is torn along the line 29 so that the main body portion 25 can open from the position shown in FIGURE 3 to the position shown in FIGURE 4 whereby the refuse can be conveniently placed in the bag. Then, after a particular bag has been used, this bag can be torn off along the line 26 and then this bag can be removed and deposited in a trash can or the like. After all of the bags have been used up, a new group or set of bags can be arranged in engagement with the support member 14 so that the support member 14 can be used over and over again.

The parts can be made of any suitable material and in different shapes or sizes.

The member 14 is of a size and shape so as to hold the bags with a firm grip. The strips and tabs which remain on the member 14 after the bags are removed, can be readily pulled off or removed from the support member 14 when a new group of bags is to be mounted thereon.

The bags are glued together at the top and are provided with the perforated portions 26 so that the bags can be pulled loose from the strips when desired whereby when desired a bag can be pulled off along the tear line 26 and placed in a barrel, trash can or other receptacle. The hook or support member 14 is adapted to be slipped over the top edge of the vehicle upholstery just front of the front door 12 under the cowling on the passenger's side of the vehicle. The bags 23 may be made of oiled paper.

Minor changes in shape, size and rearrangement of details coming within the field of invention claimed may be resorted to in actual practice, if desired.

I claim:

A device of the character described comprising a support member engaging a portion of the interior of a vehicle, said support member embodying a generally vertical first section which has a lower outwardly curved end, a curved upper section terminating in a generally vertical third section, a fourth curved section extending upwardly from the lower end of said third section, said fourth section terminating in a generally vertical fifth section, said fifth section having an upper outwardly curved end portion, a plurality of bags having upper rectangular strips provided with registering openings engaging with said support member, said bags being made of oiled paper, said strips being secured together, each of said bags including front and back main body portions with one of said strips joined by a perforated tear line to the back portion, each bag including opposed side portions having accordion-like folds so as to permit the bags to be properly opened when they are to be used, and a tab on the upper end of said front portion of each bag along a perforated line and provided with an opening receiving therethrough of a portion of the support member, the strips and tabs remaining on the support member after the bags are removed, and wherein the strips and tabs may be readily pulled off or removed from the support member when a new group of bags is to be mounted thereon.

References Cited in the file of this patent

UNITED STATES PATENTS

| | | |
|---|---|---|
| 287,745 | Warne | Oct. 29, 1883 |
| 1,077,537 | MacMillan | Nov. 4, 1913 |
| 1,101,107 | Tschopik | June 23, 1914 |
| 1,451,145 | Eckstein | Apr. 10, 1923 |
| 1,726,316 | Saxton | Aug. 27, 1929 |
| 1,883,108 | Thompson | Oct. 18, 1932 |
| 2,595,202 | Pardee | Apr. 29, 1952 |
| 2,817,432 | Grigsby | Dec. 24, 1957 |